US007942617B2

(12) United States Patent
Allemann et al.

(10) Patent No.: US 7,942,617 B2
(45) Date of Patent: May 17, 2011

(54) NOSE TIP CONTROL FOR CORDLESS HIGH SPEED ROTARY TOOL

(75) Inventors: Markus Allemann, Grayslake, IL (US); Wolfgang Hirschburger, Reutlingen (DE); Illya Kovarik, Chicago, IL (US)

(73) Assignee: Robert Bosch Tool Corporation, Broadview, IL (US)

( * ) Notice: Subject to any disclaimer, the term of this patent is extended or adjusted under 35 U.S.C. 154(b) by 109 days.

(21) Appl. No.: 10/757,660

(22) Filed: Jan. 14, 2004

(65) Prior Publication Data

US 2005/0152759 A1 Jul. 14, 2005

(51) Int. Cl.
*B23C 1/20* (2006.01)

(52) U.S. Cl. .................. 409/181; 173/221; 200/51 LM; 200/332.2

(58) Field of Classification Search .................. 409/181; 200/61.85, 51 LM, 293.1, 332.2, 522; 173/213, 173/217, 221; 310/47; 16/431; 451/344; *B23C 1/20*

See application file for complete search history.

(56) References Cited

U.S. PATENT DOCUMENTS

| | | | | | |
|---|---|---|---|---|---|
| 2,483,727 | A | * | 10/1949 | Frisbie | 173/217 |
| 3,226,501 | A | | 12/1965 | Seserman | |
| 3,640,635 | A | * | 2/1972 | Von Hollen | 408/101 |
| 3,699,825 | A | * | 10/1972 | Misuraca | 74/527 |
| 3,802,518 | A | * | 4/1974 | Albert | 173/29 |
| 3,959,883 | A | | 6/1976 | Walls et al. | |
| 4,243,388 | A | | 1/1981 | Arai | |
| 4,772,765 | A | * | 9/1988 | Markle et al. | 200/1 V |
| 4,777,393 | A | * | 10/1988 | Peot | 310/50 |
| 4,866,319 | A | * | 9/1989 | Crutchfield | 310/47 |
| 5,015,227 | A | | 5/1991 | Broadwin et al. | |
| 5,226,904 | A | | 7/1993 | Gentelia et al. | |
| 5,311,949 | A | * | 5/1994 | Chapin | 173/217 |
| 5,357,179 | A | | 10/1994 | Abbagnaro et al. | |
| 5,433,702 | A | | 7/1995 | Zelman et al. | |
| 5,664,634 | A | | 9/1997 | McCracken | |

(Continued)

FOREIGN PATENT DOCUMENTS

EP 1287948 3/2003

(Continued)

OTHER PUBLICATIONS

Webster's Online Dictionary defintion of "Switch", http://www.merriam-webster.com/dictionary/switch.*

*Primary Examiner* — Eric A Gates
(74) *Attorney, Agent, or Firm* — Greer, Burns & Crain, Ltd.

(57) ABSTRACT

A control mechanism for a rotary hand tool of the type having a generally cylindrical housing in which a drive motor is located, the housing having a nose portion from which a motor output shaft extends and a grip portion, the mechanism including an electrical control circuit that controls the application of power to and the operation of the motor, and a light touch switch having at least a first position or state and a second position or state coupled to the electrical control circuit for selectively enabling or disabling the control circuit to turn the motor on and off. The switch is disposed on the nose portion of the rotary hand tool such that an operator can actuate the switch substantially without altering the operator's grip on the tool.

12 Claims, 4 Drawing Sheets

U.S. PATENT DOCUMENTS

| | | | | |
|---|---|---|---|---|
| 5,712,543 | A * | 1/1998 | Sjostrom | 318/71 |
| 6,186,058 | B1 | 2/2001 | Ehrig, Jr. et al. | |
| 6,220,368 | B1 * | 4/2001 | Ark et al. | 173/178 |
| 6,264,756 | B1 | 7/2001 | Boys | |
| 6,817,424 | B1 * | 11/2004 | Su et al. | 173/217 |

FOREIGN PATENT DOCUMENTS

| | | |
|---|---|---|
| GB | 1201927 | 8/1970 |
| NL | 1017424 | 8/2002 |

* cited by examiner

NOSE TIP CONTROL FOR CORDLESS HIGH SPEED ROTARY TOOL

FIELD OF THE INVENTION

The instant invention is related to control mechanisms for rotary hand tools.

BACKGROUND OF THE INVENTION

The present invention generally relates to a control mechanism for an electrical powered rotary hand tool that more particularly includes an actuator having a configuration and location that reduces or eliminates an operator's need to alter a grip on the rotary hand tool when controlling the actuation of the rotary hand tool.

Electrical slide switches have long been used to control the operation of many electrical powered rotary hand tools, principally for actuating, deactuating and controlling the operating speed of many kinds of variable speed hand tools. One exemplary hand tool with which these electrical slide switches have conventionally been used are those used in woodworking and the like as marketed by the Robert Bosch Power Tool Company of Chicago, Ill. under the Dremel trademark. Such tools have an elongated generally cylindrical configuration with a rotating output shaft at the nose end to which various tools can be attached for performing tasks such as engraving, carving, polishing, cleaning, cutting, grinding, sharpening and sanding. Many of these tools have a variable speed capability which is controlled by operation of a slide switch that is located near the rear end of the tool and which is movable in a circumferential direction between an off position and a maximum speed position.

Light touch switches have conventionally been provided in devices wherein depression of the switch had a first desired effect and release of the switch had a second desired effect, such as in handheld calculators. Light touch switches are advantageous in that they are relatively small, may be configured to be generally flat or flush with a surface of the device, and are relatively simple to operate.

SUMMARY OF THE INVENTION

The preferred embodiment of present invention is an improved control mechanism for an electrical powered rotary hand tool that includes a preferably light touch switch of the type having at least two positions or states, wherein a first position or state activates the hand tool and a second position or state for deactivates the hand tool. The control mechanism is preferably sized and configured so that a predetermined small amount of pressure actuates the mechanism, thereby either activating or deactivating the hand tool. The control mechanism is also preferably disposed at a predetermined location on the hand tool so that an operator may activate or deactivate the hand tool with reduced or eliminated hand movement.

DETAILED DESCRIPTION OF THE PREFERRED EMBODIMENTS

Broadly stated, the present invention is directed to a control mechanism for an electrical powered rotary hand tool that includes a light touch switch of the type that controls an electronic control circuit that controls the hand tool motor. The light touch switch includes at least two positions, a first position that enables the electronic control circuit, thereby activating the rotary hand tool, and a second position that disables the electronic control circuit, thereby deactivating the rotary hand tool. It should be understood that the control circuit controls the operation of the motor and therefore switches the motor current during operation, the light touch switch controls the control circuit and does not have to switch the motor current and can therefore be a much smaller switch.

While the control mechanism of the instant invention is contemplated for use in any electronic device wherein an operator manually controls both activation and deactivation of the device, for purposes of illustration, the instant invention will be shown and described with an electrical powered rotary hand tool of the type having an elongated, generally cylindrical configuration with a rotating output shaft at a nose end to which various tools can be attached for performing tasks such as engraving, carving, polishing, cleaning, cutting, grinding, sharpening and sanding.

Figure 1:
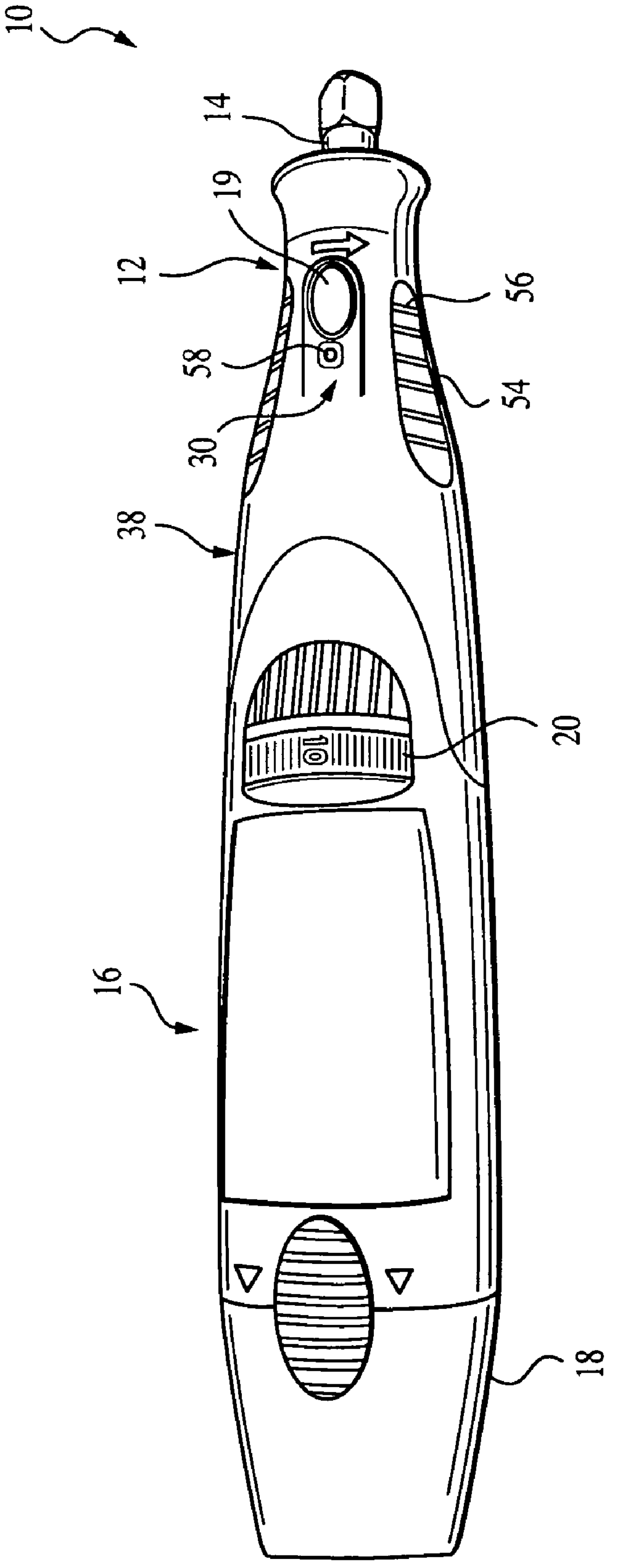
FIG. 1 is a top plan view of one embodiment of an exemplary tool with which a preferred embodiment of the control mechanism of the instant invention may be operated.

Turning now to FIG. 1, the exemplary electrical powered rotary hand tool operated by a preferred embodiment of the control mechanism of the instant invention is illustrated generally at 10. The electrical powered rotary hand tool 10, includes a generally cylindrical housing that includes a nose end portion 12 from which an output shaft 14 extends, and a center motor portion 16, which houses the motor (not shown) that drives the output shaft 14. A battery pack 18 is optionally included at the rear end of the housing, but may not be present in tools powered via a power cord. A depressible locking lever 19 is also preferably provided which is configured to engage an opening in the output shaft 14 to prevent rotation thereof while a bit or other tool is being attached to the tool 10.

Intermediate of the nose portion 12 and the motor portion 16 is an electrical slide switch 20 that is coupled to the control circuit to control the variable rotating speed of the motor. The electrical slide switch 20 preferably provides a variable electrical resistance value, which can be used in circuit to vary operating parameters as a function of the position of a switch lever.

During operation, an operator typically grips the tool 10 around the nose portion 12, similar to the manner in which an operator would grip a pen or pencil. Ergonomically, it is preferable that the nose portion taper in circumference at the nose end near the output shaft 14, so that an operator may comfortably grip the nose portion and maintain optimum control over the tool 10. While the tapered nose portion 12 is ergonomically advantageous, it does reduce the surface area available for accessories. For example, size considerations alone suggest that the slide switch 20 presently illustrated would likely require modification if it were to be disposed on the tapered nose portion 12. However, the surface area of the tapered nose portion 12 is sufficiently large that a small switch may be configured to be disposed thereon.

Figure 2:
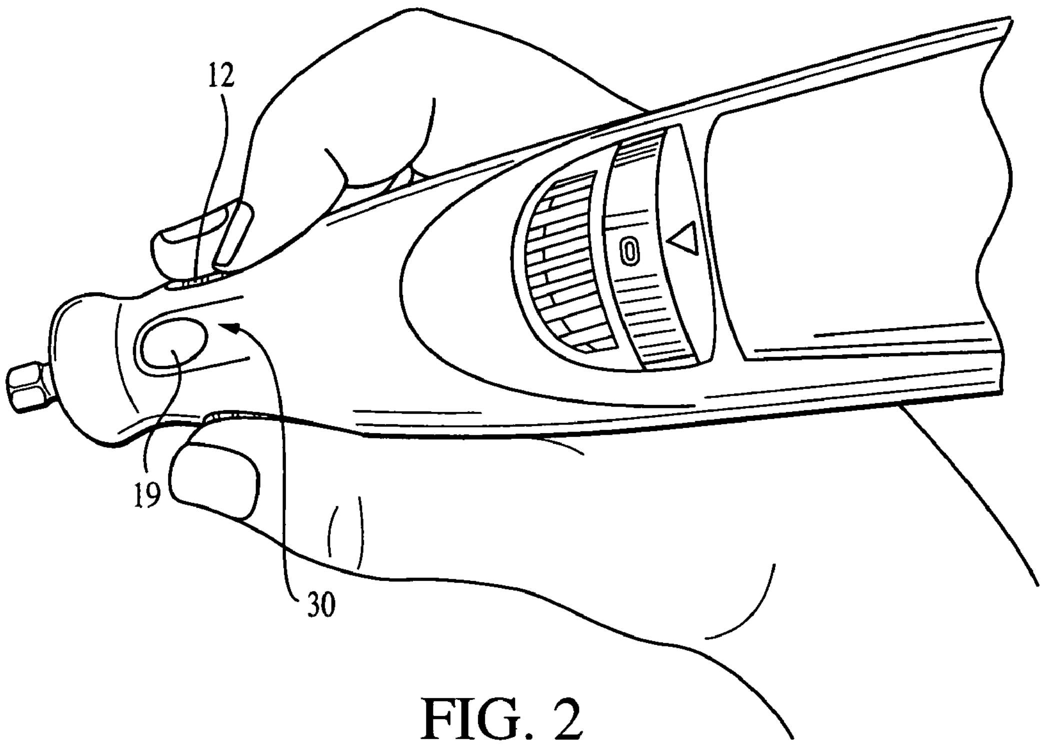
FIG. 2 is a perspective view of another embodiment of an exemplary tool.
Figure 3:
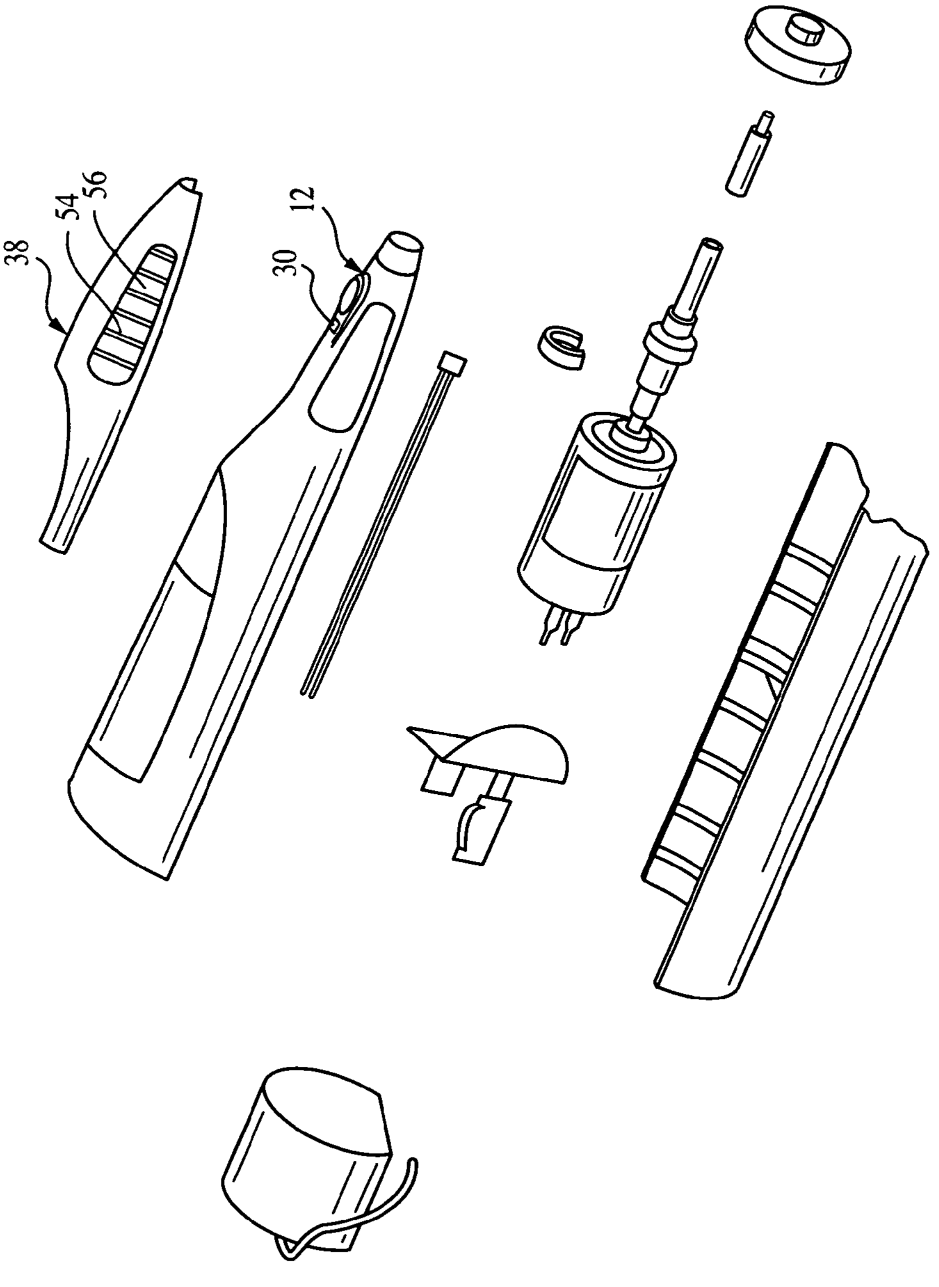
FIG. 3 is an exploded view of the exemplary tool illustrated in FIG. 1.

Accordingly, as illustrated in FIG. 3, the preferred embodiment of the instant invention contemplates an improved control system for the tool 10 that includes a light touch switch 30 disposed on a portion of the nose portion 12. In this embodiment, the light touch switch 30 is disposed such that during the ordinary course of operation, the operator may actuate the light touch switch without any significant regripping of the tool 10. As is best seen in the embodiment illustrated in FIG. 2, the operator may conveniently grip the nose portion 12 of the tool 10 much like one would grip a pencil, with the nose portion being gripped between the thumb and the first two fingers and with the center portion 16 resting in the base of the thumb and first finger. In this position, the first finger is located very close to the switch 30 so that it may be actuated without any substantial regripping of the tool.

Figure 4:
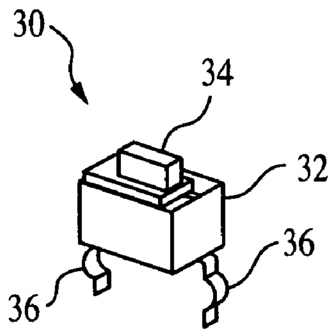
FIG. 4 is a side perspective view of a light touch switch.

Turning now to FIG. 4, the light touch switch 30 preferably includes a generally rectangular housing 32 having a predetermined depth and a generally planar top surface, through which a generally rectangular movable switch element 34 extends. The switch element 34 is preferably spring-biased within the housing 32 in an extended position. Compression of the spring allows depression of the switch element and a corresponding actuation of the switch 30. Preferably, a top surface of the switch element 34 is generally coextensive with a surface of the tool 10.

Electrical contact legs 36 extend from a bottom surface of the housing 32. The tapered nose portion 12 of the tool has a limited surface area and volume to accommodate electrical components. Therefore, the size of the light touch switch 30 is preferably minimized to consume the least amount of surface area and depth, while being large enough to impart tactile qualities to the switch to enhance ease of operation of the switch. In the preferred embodiment, the housing 32 has a length of approximately 6.0 mm, a width of approximately 3.5 mm, and a depth of approximately 3.5 mm, exclusive of the depth added by the contacts 36. The switch element 34 preferably has a length of approximately 3.0 mm, and a width of approximately 1.4 mm.

The nose portion 12 of the tool accordingly includes a correspondingly sized and configured recess for receiving the light touch switch 30. The recess is configured so that the light touch switch 30 fits within the recess, in a manner whereby the top surface of the switch element 34 is generally coextensive with the top surface of the nose portion 12.

Preferably, the light touch switch 30 includes at least two positions or states: a first open circuit position or state in which the tool 10 is deactivated, and a second closed circuit position or state, wherein the tool is activated. In the preferred embodiment, the light touch switch 30 is provided in addition to the slide switch 20, which controls the operating speed. The light touch switch 30 selectively enables and disables an electrical control circuit that controls the operation of the tool motor. Because the light touch switch 30 does not directly switch the motor, it does not have to conduct or switch the motor load current and is therefore much more susceptible to miniaturization. When enabled, motor current reaches the output shaft, and when disabled, the motor current is prevented from reaching the output shaft, thereby resulting in either actuation or deactivation.

Figure 5:
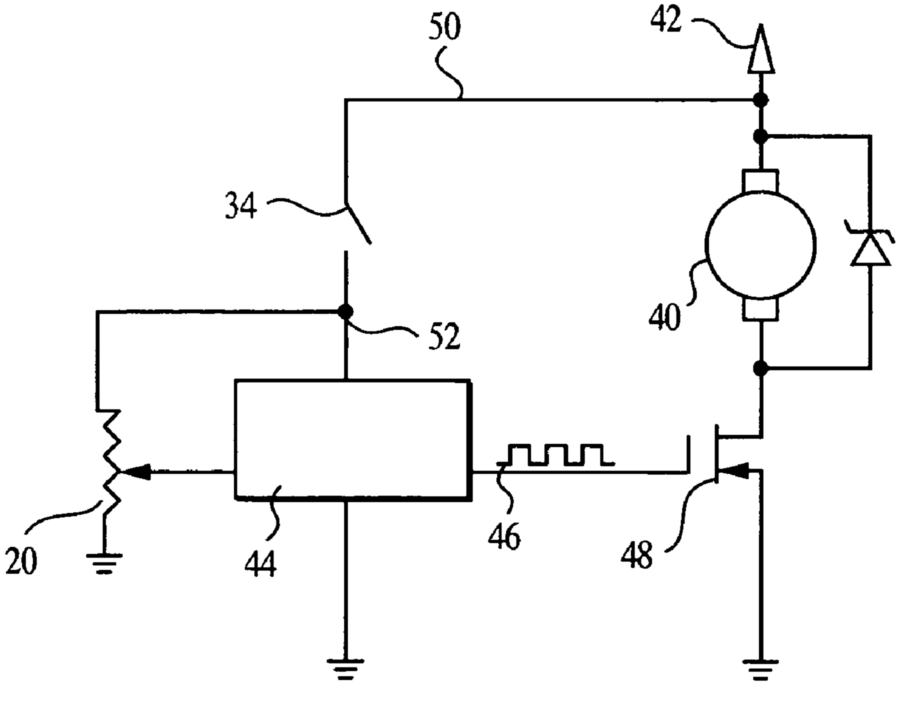
FIG. 5 is a schematic circuit diagram illustrating circuitry that may be used in the preferred embodiment shown in FIG. 1.

As illustrated in FIG. 5, an electrical control and drive circuit for the tool is illustrated together with a light touch switch 34. The tool motor 40 is connected to a power source 42 that can be AC or DC. The motor speed of operation is controlled by an oscillator 44 that is controlled by the speed setting slide switch 20, with the oscillator providing a pulsed output on line 46 that extends to a switching transistor 48 that switches the current that flows through the motor. The duty cycle of the pulsed output is a function of the position of the slide switch 20 and thereby varies the operating speed accordingly. The power source 42 also extends through line 50, the light touch switch 34 and line 52 to power the oscillator 44. When the switch 34 is closed, the oscillator 44 will operate and when the switch is opened, the oscillator will be disabled. Since the amount of power necessary to operate the oscillator is relatively small, the small switch 34 can effectively provide an on/off switching capability of the motor 40. Thus, the light touch switch 30 of the instant invention is preferably one of a variety of switches denominated as "light touch switches," wherein a predetermined amount of pressure will depress the switch element 34, resulting in actuation of the tool 10. In the preferred embodiment of the instant invention, actuation of the tool 10 may be accomplished by depressing the light touch switch to a depth of only approximately 1/16 of an inch. When disposed on or within the tapered nose portion 12, the light touch switch 30 preferably includes a tactile surface that engages either the operator's finger or an intermediate material, and it may be perceived by the operator to the touch, either directly or through an intermediate material.

The preferred embodiment of the instant invention further includes a thin layer of flexible material, or grip layer 38, that is intermediate the light touch switch 30 and the operator's finger. The grip layer 38, when present, serves a variety of purposes. First, the grip layer 38 is preferably composed of a rubber material such as TPE, and thereby promotes the overall grip on the tool 10 by the operator. The rubber of the grip layer 38 is preferably textured, and may additionally be grooved to enhance gripping properties, and creates additional friction between the surface of the grip layer and the portions of the operator's hands in contact with the surface. Second, in addition to the tactile properties of rubber, the rubber provides a cushioned grip for the operator.

The grip layer 38 of the preferred embodiment is disposed over the portion of the nose portion 12 housing the light touch switch 30 and that portion of the nose portion wherein the operator's hand typically grips the tool 10. Thus, the grip layer 38 of the preferred embodiment includes a predetermined structure, but that structure may be varied to suit individual applications or even individual operators. For example, turning now to FIGS. 1 and 3, a majority of the nose portion 12 is covered by the grip layer 38, ensuring that a multitude of hand positions by the operator will confer the advantages of the grip layer.

The grip layer 38 may be configured to include additional preferable features as well. For example, the grip layer 38 may include one or more textured portions 54 that may include ribs 56 or recesses or other patterns. The textured portions 54 may themselves be recessed so that a radius measured from a longitudinal axis of the tool 10 to the textured portions is less than that as measured from the longitudinal axis to the balance of the nose portion 12. This configuration enhances operator grip as well.

With respect to the light touch switch 30, the grip portion 38 may be further configured to enhance actuation of the tool 10. Preferably, the grip portion 38 may optionally include indicia to demarcate the location of the light touch switch 30, such as a small, generally circular opening 58 that reveals a clearly colored portion of the light touch switch. However, even in the absence of visual indicia, the constituent material of the grip layer 38 is such that the operator may perceive the switch via touch underneath the grip layer as a protruberance underneath the grip layer. Thus, compression of the grip layer 38 may cause compression of the light touch switch 30 when an underside of the grip layer abuts and compresses the light touch switch into the second position. As illustrated in the embodiment represented by FIG. 2, even in the absence of visual indicia, the operator may compress the area of the grip layer 38 that generally corresponds to a location of the underlying light touch switch 30 to actuate the switch.

As further indication of the location and position of the light touch switch 30, the light touch switch may preferably be configured to include a positive feedback mechanism, such as an audible indication of depression into the second position or state and subsequent release into the first position or state. The audible indication may be as simple as a click that sounds as the switch element 34 is depressed. In addition to being audible, such a click may also be perceived by the operator via touch.

The preferred embodiment of the present invention includes a light touch switch 30 having a detented or clicking action so that the operator can easily perceive movement that is being made by the light touch switch during operation and also hold the switch in its desired location. The preferred detenting action provides sufficient level of resistance to initial movement that the likelihood that the light touch switch 30 will move without a conscious force being applied to it is quite small. If the light touch switch 30 is being used in a rotating hand tool such as a Dremel tool, normal vibration experienced during operation of the tool should not affect the position of the switch 30. Also, the resistance to movement provided by the detenting action of the switch mechanism will not result in movement of the switch 30 by most levels of incidental contact that is experienced during use.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A control mechanism for a rotary hand tool having a generally cylindrical housing in which a drive motor is located, the housing having a generally tapered nose portion at an end from which a motor output shaft extends and a grip portion around which an operator can wrap a hand during operation of the tool and within which portion the motor is housed, said control mechanism being a part of the tool and located substantially within the housing thereof and comprising:

an electrical control circuit contained entirely within said housing, said circuit controlling the application of power to and the operation of the motor, including supplying current to the motor; and a light touch electrical switch having at least two electrical switch contacts that are configured to be placed in at least a first position wherein said electrical switch contacts are closed circuited and a second position wherein said electrical switch contacts are open circuited, said electrical switch being coupled to said electrical control circuit for selectively enabling or disabling said control circuit to turn the motor on and off, wherein said motor current does not flow through said electrical switch contacts when said switch contacts are in either said first or second positions;

wherein said electrical switch is disposed on the tapered nose portion of the rotary hand tool such that an operator can actuate said electrical switch without altering the operator's grip on the tool.

2. The control mechanism of claim 1 wherein said switch is configured to be generally rectangular.

3. The control mechanism of claim 1 wherein said electrical switch has a predetermined thickness.

4. The control mechanism of claim 1 wherein said first position disables said electrical control circuit and said second position enables said electrical control circuit.

5. The control mechanism of claim 1 wherein the tapered nose portion on which said electrical switch is disposed generally corresponds to a location of the operator's index finger when grasping the tool.

6. The control mechanism of claim 1 further comprising a layer of flexible grip material surrounding at least a portion of the nose portion.

7. The control mechanism of claim 6 further comprising a layer of rubber surrounding the portion of the nose portion in which said switch is disposed.

8. The control mechanism of claim 6 wherein said flexible grip material abuts said switch when said compressible material is compressed.

9. The control mechanism of claim 1 further comprising a layer of grip material surrounding the portion of the nose portion in which said electrical switch is disposed.

10. Apparatus for selectively controlling power applied to and the operation of the motor of a rotary hand tool having a generally cylindrical housing that includes a generally tapered nose portion that has a gradually reduced circumference toward an end from which an output shaft extends, and a grip portion around which an operator wraps a hand during operation of the tool, said apparatus comprising:

electrical control circuitry for controlling power, including motor current that is applied to the motor, said electrical circuitry being a part of the tool and located entirely within the housing;

an electrical switch having a switch button and containing at least a pair of electrical switch contacts that are selectively opened and closed responsive to actuation of said switch button, said electrical switch being operatively connected to said control circuitry to control the operation of the motor, including the application of motor current to the motor, said electrical switch being configured so that said motor current does not pass through the electrical switch contacts during operation of the motor, said electrical switch being a part of the tool and located substantially within the tapered nose portion thereof; and a cavity disposed in the tapered nose portion of the tool that is configured to receive at least a portion of said electrical switch and permit actuation of said switch button.

11. Apparatus as defined in claim 10 further comprising a layer of grip material surrounding at least a portion of the grip portion in which said electrical switch is located.

12. Apparatus as defined in claim 10 wherein the outer surface of said switch button is generally coextensive with the outer surface of said nose portion.

* * * * *